(12) United States Patent
Revega et al.

(10) Patent No.: US 9,694,993 B2
(45) Date of Patent: Jul. 4, 2017

(54) REDUCED PIPE WEAR IN SLURRY TRANSPORT PIPELINES

(71) Applicant: SYNCRUDE CANADA LTD. in trust for the owners of the Syncrude Project, as such owners exist now and in the future, Fort McMurray (CA)

(72) Inventors: Tim Revega, Sherwood Park (CA); Stefano Chiovelli, Edmonton (CA); Kevin Reid, Edmonton (CA)

(73) Assignee: SYNCRUDE CANADA LTD. in trust for the owners of the Syncrude Project as such owners exist now and in the future, Fort McMurray (CA)

( * ) Notice: Subject to any disclaimer, the term of this patent is extended or adjusted under 35 U.S.C. 154(b) by 0 days.

(21) Appl. No.: 14/539,752

(22) Filed: Nov. 12, 2014

(65) Prior Publication Data
US 2015/0132073 A1 May 14, 2015

Related U.S. Application Data

(60) Provisional application No. 61/903,306, filed on Nov. 12, 2013.

(51) Int. Cl.
*B65G 53/30* (2006.01)
*F17D 1/08* (2006.01)

(52) U.S. Cl.
CPC ............. *B65G 53/30* (2013.01); *F17D 1/088* (2013.01)

(58) Field of Classification Search
CPC ..... B65G 53/30; B65G 53/523; B65G 53/526
USPC .......................................... 406/14, 193, 197
See application file for complete search history.

(56) References Cited

U.S. PATENT DOCUMENTS

| | | | | |
|---|---|---|---|---|
| 3,904,248 A | * | 9/1975 | Cochran | F17D 1/14 406/197 |
| 3,929,379 A | * | 12/1975 | Krambrock | 406/95 |
| 4,167,292 A | * | 9/1979 | Eller | E21C 41/31 299/17 |
| 4,740,217 A | * | 4/1988 | Lambertz | 48/197 R |
| 7,300,074 B1 | * | 11/2007 | Paulson | F16L 43/001 285/179 |
| 8,074,715 B2 | * | 12/2011 | Rispler | E21B 33/1208 166/192 |
| 9,133,701 B2 | * | 9/2015 | Luharuka | E21B 43/267 |
| 2008/0276723 A1 | * | 11/2008 | Gysling | 73/861.04 |
| 2009/0214302 A1 | * | 8/2009 | Ilgner | 406/14 |
| 2010/0175878 A1 | * | 7/2010 | Rispler | E21B 33/134 166/280.1 |
| 2012/0160811 A1 | * | 6/2012 | Brandstrom | 219/76.1 |

(Continued)

OTHER PUBLICATIONS

Kaushai, et al. "Concentration at the Pipe Bottom at Deposition Velocity for Transportation of Commercial Slurries Through Pipeline". Powder Technology. 2002. pp. 89-101. vol. 125(1).

*Primary Examiner* — Joseph Dillon, Jr.
(74) *Attorney, Agent, or Firm* — Bennett Jones LLP

(57) ABSTRACT

A process for operating a settling slurry transportation pipeline is provided, comprising: determining the deposition velocity for a particular slurry being transported through the pipeline; and operating the pipeline at an operating velocity at or near the deposition velocity to form a stationary or near stationary bed of solids that will still allow the slurry to freely flow through the pipeline and not plug the pipeline.

15 Claims, 10 Drawing Sheets

(56) References Cited

U.S. PATENT DOCUMENTS

| | | | |
|---|---|---|---|
| 2013/0307262 A1* | 11/2013 | Sisk | F16L 57/06 285/133.11 |
| 2014/0026666 A1* | 1/2014 | O'Keefe et al. | 73/622 |
| 2014/0026667 A1* | 1/2014 | O'Keefe et al. | 73/622 |
| 2015/0132539 A1* | 5/2015 | Bailey | C23C 14/028 428/141 |

* cited by examiner

REDUCED PIPE WEAR IN SLURRY TRANSPORT PIPELINES

FIELD OF THE INVENTION

The present invention relates to a process for reducing pipe wear in slurry transport pipelines by operating the pipeline at a velocity that produces a stationary or near stationary solids bed at the bottom of the pipe.

BACKGROUND OF THE INVENTION

The wear on slurry transportation pipelines within the oil sand industry is a major driver of both downtime and capital expenditure. Oil sand slurries are reasonably concentrated (>35% solids by volume), typically having a sand particle diameter between 0.18 and 0.3 mm and rocks and lumps to about 125 mm, which are transported at reasonably high velocities (3 to 5.5 m/s), In an oil sand mining operation, there are a number of pipelines which contain settling slurries. An example of two major slurry pipeline systems, among others which exist in an oil sand mining and extraction operation, are oil sand hydrotransport pipelines, which carry concentrated slurries of oil sand and water from the mine to the extraction plant, and coarse tailings pipelines, which carry a concentrated slurry of sand, clay fines and water from the extraction plant to the sand storage/disposal area. Other examples include coke slurry pipelines to transport coke produced during upgrading and composite tails pipelines.

As with most conventional slurry pipelines, oil sand slurry pipelines are operated above a threshold operating velocity to ensure that a blockage does not form due to the deposition of solids present in the slurry. This threshold velocity is known as the deposition velocity, the velocity at which the deposition of solids occurs. Generally, the minimum operating velocity is usually kept as 0.5 m/s more than the deposition velocity (Kaushai et al., (2002) Powder Technology, vol. 125, Issue 1, 89-101). The deposition velocity is commonly measured in laboratory settings by locating a gamma ray densitometer at 5% of the pipe diameter from the lower pipe surface and the density at this location is monitored while the pipeline velocity is decreased. When the density reaches a value that corresponds to the solid packing density for the particular material, the deposition velocity has been reached. If the velocity is reduced further below the deposition velocity, the pipeline will become progressively more filled with a bed of particles and at some point the pumping capacity of the system will not be able to overcome the increased pressure gradient within the pipeline. At this point, it is necessary to shut the system down to clear out the blockage and the pipeline can be said to have "sanded-off". Thus, for a given volumetric throughput of material, the pipe diameter must be chosen to ensure that solids deposition does not occur. In the design of industrial scale pipelines, computerized models are used to predict the deposition velocity apriori. The deposition velocity as measured in a laboratory setting is included in these computerized models and the models can then be used to predict the deposition velocity within commercial pipelines.

Pipeline wear is proportional to the pipeline velocity and having to operate above the deposition velocity can lead to accelerated wear rates. Operating above the deposition velocity leads to either a sliding bed being present on the pipe bottom or a relatively quick moving region of higher density material. Since erosion is dependent upon both the flow velocity and the particle concentration, both of these scenarios lead to high wear rates on the pipe bottom. Thus, typically, the pipelines have to be maintained by frequent rotations, increasing the wall thickness, or by costly upgrades, e.g., using pipes having a non-metallic lining such as rubber, urethane, etc.

SUMMARY OF THE INVENTION

It was discovered by the present applicant that, when operating a conventional oil sand slurry pipeline made, for example, from stainless steel pipe, at relatively high velocities, the greatest erosion occurs at the 6 o'clock position of the pipe, i.e., the pipe bottom, when slurry is pumped conventionally at higher than deposition velocity. However, it was surprisingly discovered that operating the slurry transportation pipeline near or below the deposition velocity (i.e., at stationary bed conditions) resulted in decreased wear of the pipe due to the formation of a protective stationary bed at the 6 o'clock position of the pipe. As used herein, a "stationary bed" means a bed of solids deposited at the bottom of a pipe which moves very slowly through the pipe. This will also be referred to herein as a "near stationary bed". Thus, by operating the slurry pipeline near or below deposition velocity, wearing of the pipe, especially at the 6 o'clock position, can be reduced by close to ten times or more, thereby dramatically increasing the projected life of the pipeline. Without being bound to theory, it is believed that the formation of this stationary bed is acting as a protective layer to the pipe interior. Thus, the present invention can be used for any settling slurries including, by example, hydrotransport pipelines that pipeline oil sand slurry from slurry preparation units to primary bitumen recovery units and tailings pipelines that transport coarse and composite tailings from plant to disposal areas.

It was also discovered that, in some instances where the stationary bed reduces the inner diameter of the pipe, loss of flow rate can be compensated for by increasing the diameter of the pipe used.

In one aspect, a process for operating a slurry transportation pipeline is provided, comprising:
  determining the deposition velocity for a particular slurry being transported through the pipeline; and
  operating the pipeline at an operating velocity near or below the deposition velocity to form a stationary or near stationary bed of solids that will still allow the slurry to freely flow through the pipeline and not plug the pipeline.

In one embodiment, the velocity at which the pipeline is operated is not more than about 5% above the deposition velocity and not more than about 40% below the deposition velocity. In another embodiment, the operating velocity is within about 5% of the deposition velocity. In another embodiment, the pipeline is operated at least about 10% below the deposition velocity. In another embodiment, the pipeline is operated at between about 10% to about 40% below the deposition velocity. In one embodiment, operating the pipeline at the operating velocity near or below the deposition velocity is accomplished by replacing some or all of the pipe of the pipeline with larger diameter pipe. In one embodiment, operating the pipeline at the operating velocity near or below the deposition velocity is accomplished by installing adequate pump horsepower to lift or move the stationary bed when pipeline pressure gradients are trending upwards at constant flow rate and/or the pipeline capacity is being reduced at a given pump speed.

In another aspect of the present invention, pipeline blockage by the accumulation of solids (also referred to as "sanding the line") may be further controlled and avoided through the use of instrumentation such as densitometers, ultrasonic velocity measurements, electrical tomography or other appropriate instrumentation to ensure the pipeline remains in an operable range given the variable nature of the feed.

In one embodiment, a number of densitometers are place along the circumference of the pipe, for example, at the 155° and 130° position of the pipe. When accumulation of solids reach a critical point, e.g., either too little of a solids bed forming or too great of a solids bed forming, the velocity can be either decreased or increased accordingly. In one embodiment, the stationary or near stationary bed of solids has a relative bed height of about 0.05, i.e., about 5% of the diameter of the pipe (y/Dp). In another embodiment, the relative bed height is between about 0.05 and 0.1. In another embodiment, the relative bed height is between about 0.05 and 0.2. In another embodiment, the relative bed height is less than about 0.25.

As used herein, "slurry" is defined as a mixture of a solid(s) with a liquid (usually water) which is capable of being pumped through a slurry pipeline.

BRIEF DESCRIPTION OF THE DRAWINGS

Referring to the drawings wherein like reference numerals indicate similar parts throughout the several views, several aspects of the present invention are illustrated by way of example, and not by way of limitation, in detail in the figures, wherein.

DETAILED DESCRIPTION OF THE PREFERRED EMBODIMENTS

The detailed description set forth below in connection with the appended drawings is intended as a description of various embodiments of the present invention and is not intended to represent the only embodiments contemplated by the inventor. The detailed description includes specific details for the purpose of providing a comprehensive understanding of the present invention. However, it will be apparent to those skilled in the art that the present invention may be practiced without these specific details.

The present invention relates generally to a process for operating a slurry transportation pipeline so that slurry pipeline wear rates are reduced. Industrial slurry pipeline wear rates are generally governed by erosion-corrosion mechanisms. Much of that wear occurs at the 180 degree, or 6 o'clock position of the pipe, also referred to as the bottom of the pipe.

In the applicant's facilities, two major types of slurry transport pipelines, among others, are being continuously operated; oil sand hydrotransport pipelines, which are generally about 5 km long, and coarse tailings pipelines, which are generally about 10 km long. Hydrotransport pipelines are generally comprised of either carbon steel (CS) or stainless steel (SS) pipe or non-metallic lined piping (e.g., rubber, urethane, etc.) having an inner diameter of about 27" to about 30".

Generally, the thickness of the wall of the pipe is about ½" to about ¾" for metallic piping. The hydrotransport pipelines are operated well above the deposition velocity, e.g., at an average velocity of about 4.5 m/s when $\rho=1550$ kg/m$^3$ and T=50° C. Of course, it is understood that the velocity is dependent upon other factors such as the $d_{50}$, percent fines of total solids content, density of the slurry, tonnage that is to be moved, etc.

Coarse tailings pipelines are also generally made from carbon steel or stainless steel or non-metallic lined piping (e.g., rubber, urethane, etc.) having an inner diameter of about 23" to about 30". The coarse tailings pipelines are also operated well above the deposition velocity, e.g., at an average velocity of between about 4.4-4.8 m/s; $\rho=1430\text{-}1520$ kg/m$^3$; $d_{50}$ (coarse)=150-220 μm; 12.5-20% fines (of total solids content); and T=35-50° C.

The following Table 1 shows a comparison of the operating velocity and deposition velocity of a hydrotransport pipeline and a coarse tailings pipeline in operation in the applicant's plant.

TABLE 1

| System | Hydrotransport Pipeline 1 | Coarse Tailings Pipeline 1 |
|---|---|---|
| Pipeline Size | 28", ½" wall | 24", ½" wall |
| Pipeline Velocity | 3.7 m/s | 4.4 m/s |
| Deposition Velocity | 2.3 m/s | 3.3 m/s |

It can be seen from Table 1 that both pipelines are operated at a velocity that is well above the deposition velocity.

Figure 1:
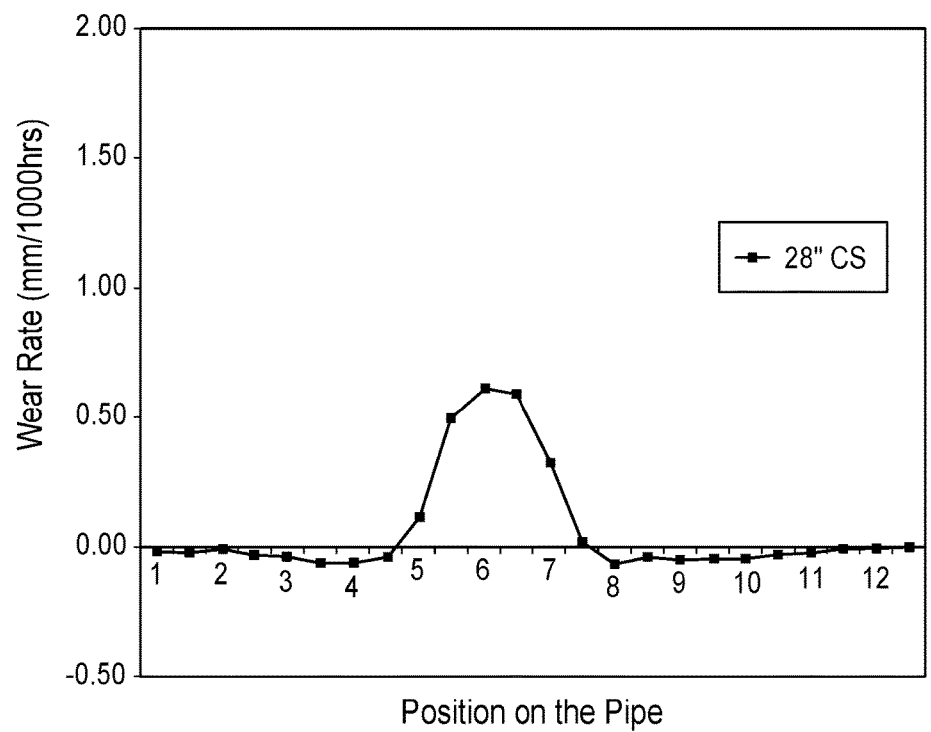
FIG. 1 shows the wear profile of a slurry hydrotransport pipeline for transporting oil sand slurry from a slurry preparation unit to a primary bitumen separation unit comprising 28" Carbon Steel (CS) pipe operating above deposition velocity after oil sand ablation has occurred.

FIG. 1 shows the wear profile of a hydrotransport pipeline comprising 28" CS pipe measured 1.4 km downstream of the slurry preparation unit (e.g., cyclofeeder) and past the first booster pump station. At this point in the hydrotransport line, most of the large lumps of oil sand have been ablated and the composition of the oil sand slurry is fairly consistent. Ultrasonic transducers are fixed around the circumference of the pipe and wall thickness measurements are taken at multiple locations along the length of the pipeline. The results can be shown graphically, with the y axis showing the wear rate in mm/1000 operating hrs at equidistance points around the circumference of the pipe (x axis). As shown in FIG. 1, 12 (o'clock) represents the very top of the pipe and 6 (o'clock) represents the very bottom of the pipe. It can be seen from FIG. 1 that most of the significant wear is occurring at the bottom, i.e., at the 6 o'clock position. This is likely primarily as a result of the formation of a "rolling bed" of solids, e.g., either a sliding bed being present on the pipe bottom or a relatively quick moving region of higher density material.

Figure 2:
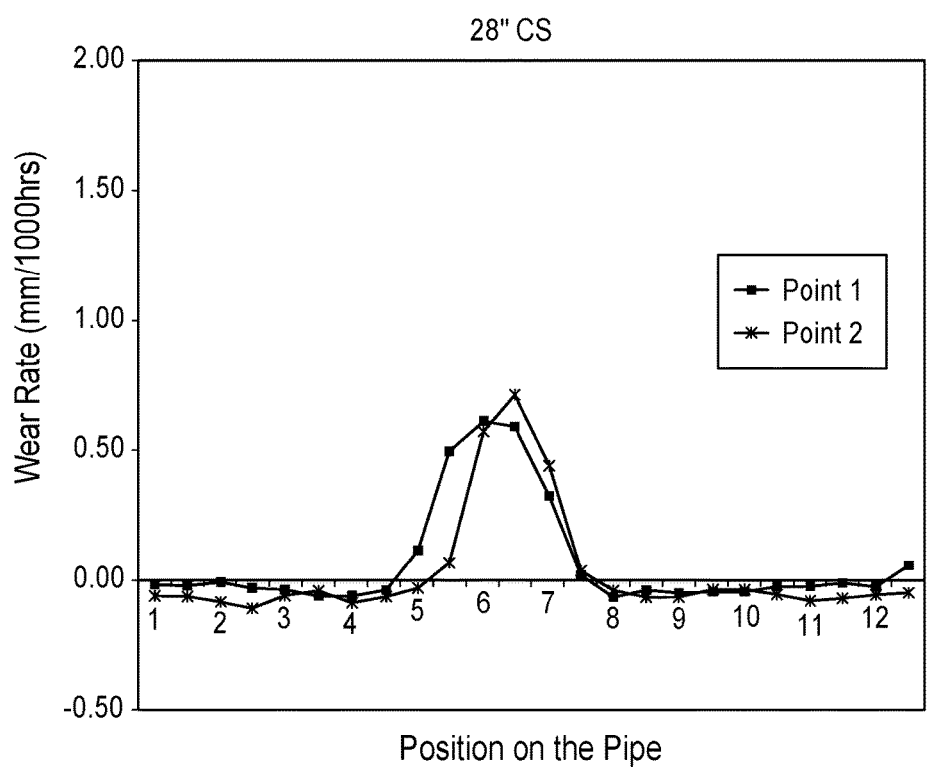
FIG. 2 shows the wear profile of a second slurry hydrotransport pipeline for transporting oil sand slurry from a slurry preparation unit to a primary bitumen separation unit comprising 28" Carbon Steel (CS) pipe operating above deposition velocity at two separate downstream points.

FIG. 2 shows the wear profile of a second hydrotransport pipeline comprising 28" CS measured at two different points, 1.4 and 2.6 km downstream of the slurry preparation unit (e.g., cyclofeeder) and past the first booster pump station. The y axis shows the wear rate in mm/1000 hrs and the x axis shows positions on the interior diameter of the pipe, 12 (o'clock) being the very top of the pipe and 6 (o'clock) being the very bottom of the pipe. Once again, it can be seen that the most significant wear was occurring around the 6 o'clock mark.

Figure 3:
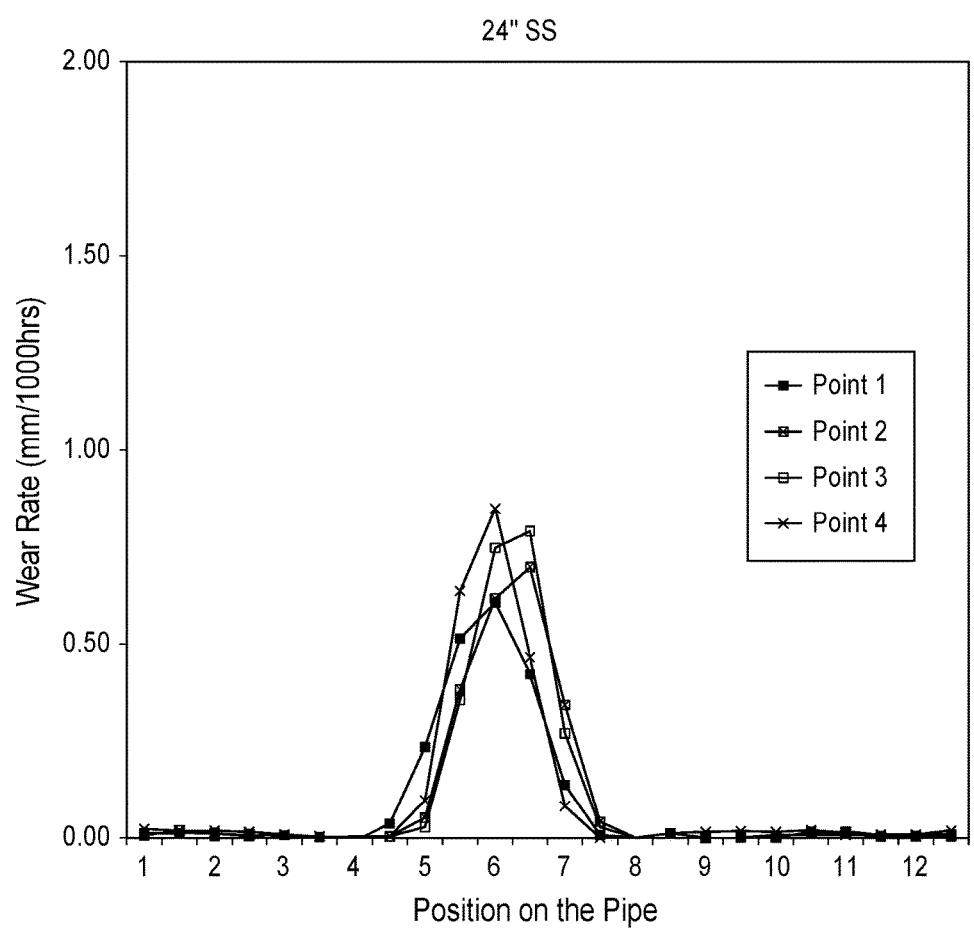
FIG. 3 shows the wear profile of a coarse tailings pipeline comprising 24" Stainless Steel (SS) pipe operating above deposition velocity at four separate points along the length of the pipeline.

The wear profile of a coarse tailings pipeline was also determined. The wear profile was determined at four different points, i.e., 0.3, 0.9, 1.8 and 2.3 km, along the length of the stainless steel portion of the pipeline and the results are shown in FIG. 3. The y axis shows the wear rate in mm/1000 hrs and the x axis shows positions on the interior diameter of the pipe, 12 (o'clock) being the very top of the pipe and 6 (o'clock) being the very bottom of the pipe. FIG. 3 shows once again that at all points along the pipeline tested, most of the substantial wear occurred at the 6 o'clock position of the pipe.

Example 1

Routinely, piping used by the applicant in coarse tailings pipelines is 24" in diameter (inner diameter). However, recently, some of the 24" pipe of Coarse Tailings Pipeline 1 was replaced with 28" pipe, as there was a need to increase the length of this pipeline and the already-installed pumping capacity was not in place to use 24" pipes for this extension. Since the pipeline pressure drop is known to decrease with pipe diameter, a section of 24" diameter piping was replaced with 28" diameter piping.

However, it was surprisingly discovered that the 28 inch lines showed significant wear rate reductions as compared to 24 inch lines. Further, it appeared as though a stationary bed had formed on the pipe bottom and that the stationary bed was acting as a protective layer to the steel.

Figure 4:
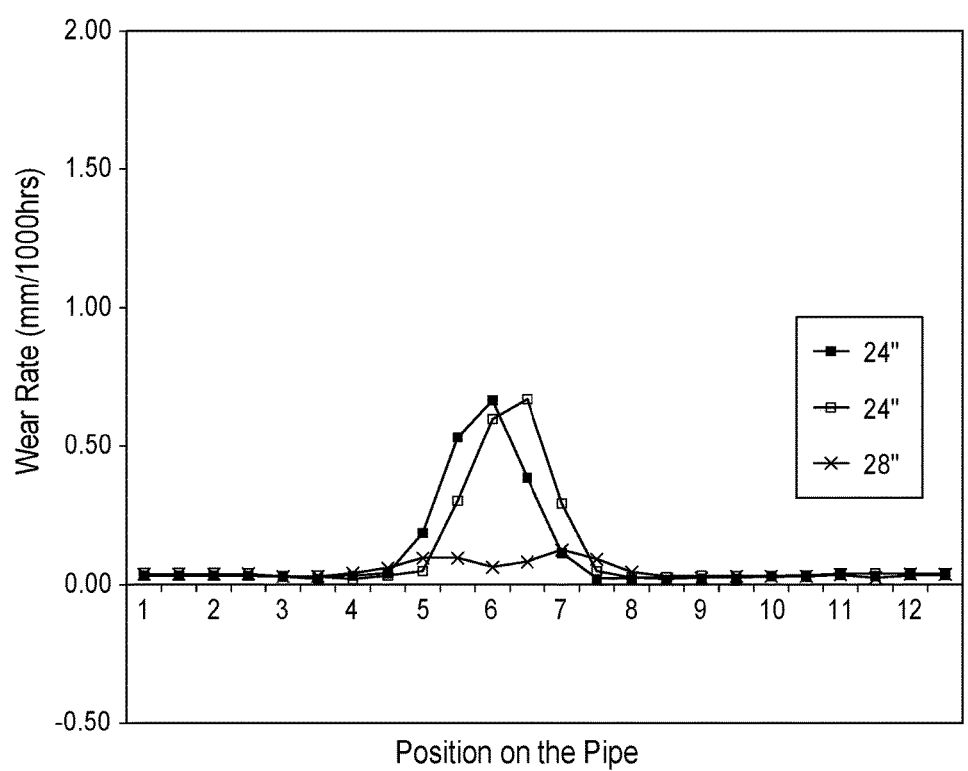
FIG. 4 shows the wear profile of the coarse tailings pipeline of FIG. 3, whereby a portion of the 24" pipeline has been replaced with larger diameter pipe, the pipeline now comprising both 24" Stainless Steel (SS) pipe and 28" Stainless Steel (SS) pipe.

FIG. 4 shows the wear rate (mm/1000 hrs) results obtained when testing Coarse Tailings Pipeline 1 for wear at two points along the pipeline where there was 24" SS pipe (dark solid squares and light solid squares). It can be seen from FIG. 4 that the 24" SS pipe showed considerable wear occurring at around the 6 o'clock position of the pipe after continuously pumping coarse tailings therethrough. This wear pattern is consistent with operating Coarse Tailings Pipeline 1 at a velocity (4.4 m/s) higher than the deposition velocity (3.3 m/s), as shown in Table 1.

Figure 5:
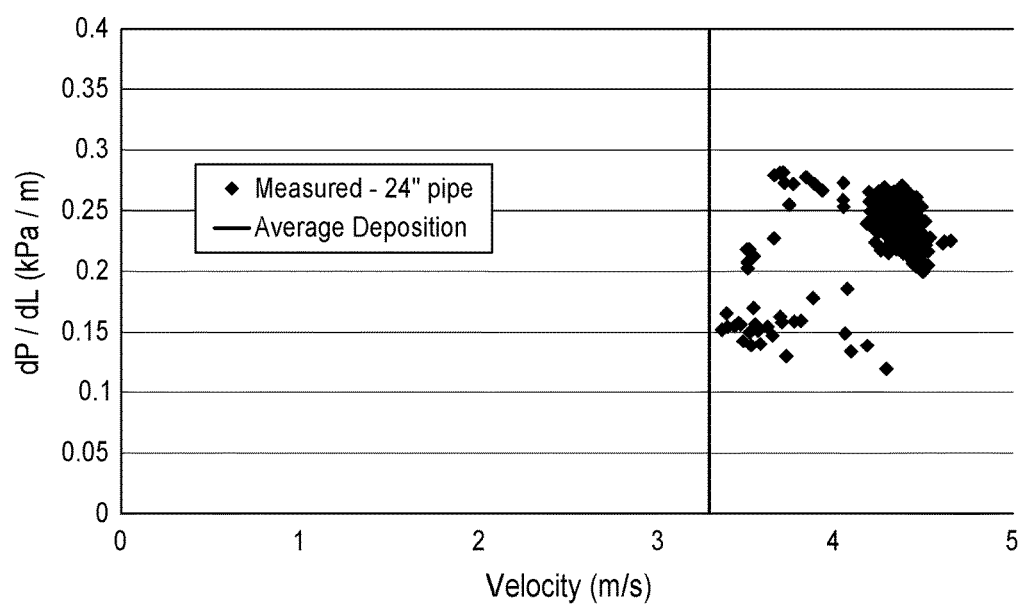
FIG. 5 is a graph showing the change in pressure over the change in length (kPa/m) versus the velocity (m/s) measured for the 24" pipe portion of the coarse tailings pipeline of FIG. 4.

FIG. 5 plots the change in pressure (dP) over the change in length (dL) (kPa/m) against the measured velocity of the coarse tailings over a period of a day for the 24" pipeline portion of Coarse Tailings Pipeline 1. The deposition velocity was calculated to be 3.3 m/s (vertical solid line). It can be seen from FIG. 5 that the velocity through the 24" pipeline was consistently higher than the deposition velocity, averaging around 4.4 m/s. Together, the results in FIG. 4 and FIG. 5 show that operating a slurry pipeline significantly above the deposition velocity of the slurry will result in faster wear of the pipeline, in particular, at the bottom (i.e., 6 o'clock position) of the pipe.

FIG. 4 further shows that the wear rate (mm/1000 hrs) of the 28" SS pipe section of Coarse Tailings Pipeline 1 (Xs through squares) was much less than that for the 24" SS pipe section. There was very little wear at the 6 o'clock position and, in fact, there was very little wear around the entire circumference of the 28" SS pipe. This is likely due to the fact that a stationery bed of solids had formed at the bottom of the 28" SS pipe due to the pipe velocity being reduced in that region due to the increased inner diameter of the pipe section (24" to 28"). Table 2 shows a comparison of the pipeline velocity and deposition velocity of Coarse Tailings Pipeline 1 for 24" pipe and 28" pipe.

TABLE 2

| System | Coarse Tailings Pipeline 1 | Coarse Tailings Pipeline 1 |
| --- | --- | --- |
| Pipeline Size | 24", ½" wall | 28", ½" wall |
| Pipeline Velocity | 4.4 m/s | 3.2 m/s |
| Deposition Velocity | 3.3 m/s | 3.5 m/s |

Figure 6:
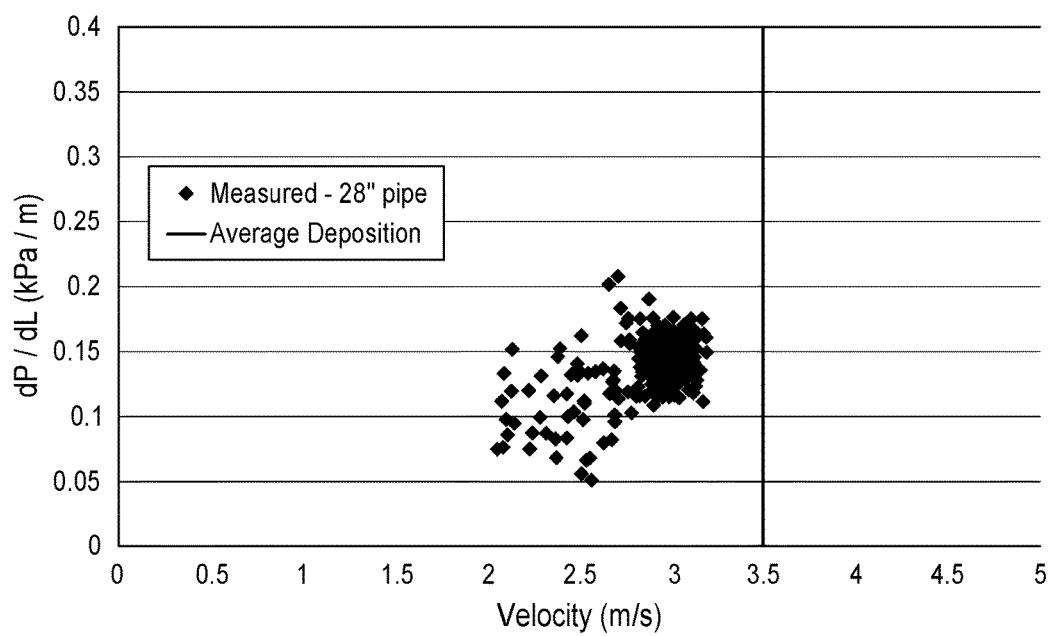
FIG. 6 is a graph showing the change in pressure over the change in length (kPa/m) versus the velocity (m/s) measured for the 28" pipe portion of the coarse tailings pipeline of FIG. 4

FIG. 6 plots the change in pressure (dP) over the change in length (dL) (kPa/m) against the velocity (m/s) of the coarse tailings over a period of a day for the 28" pipeline portion of Coarse Tailings Pipeline 1. In this instance, the deposition velocity was calculated to be 3.5 m/s (vertical solid line). It can be seen from FIG. 6 that the velocity through the 28" pipeline was consistently less than the deposition velocity, on average, about 5% to about 40% below the deposition velocity. Together, the results in FIG. 4 and FIG. 6 show that operating a slurry pipeline near or below the deposition velocity of the slurry will result in less wear of the pipeline, in particular, less wear at the bottom (i.e., 6 o'clock position) of the pipe.

Figure 7:
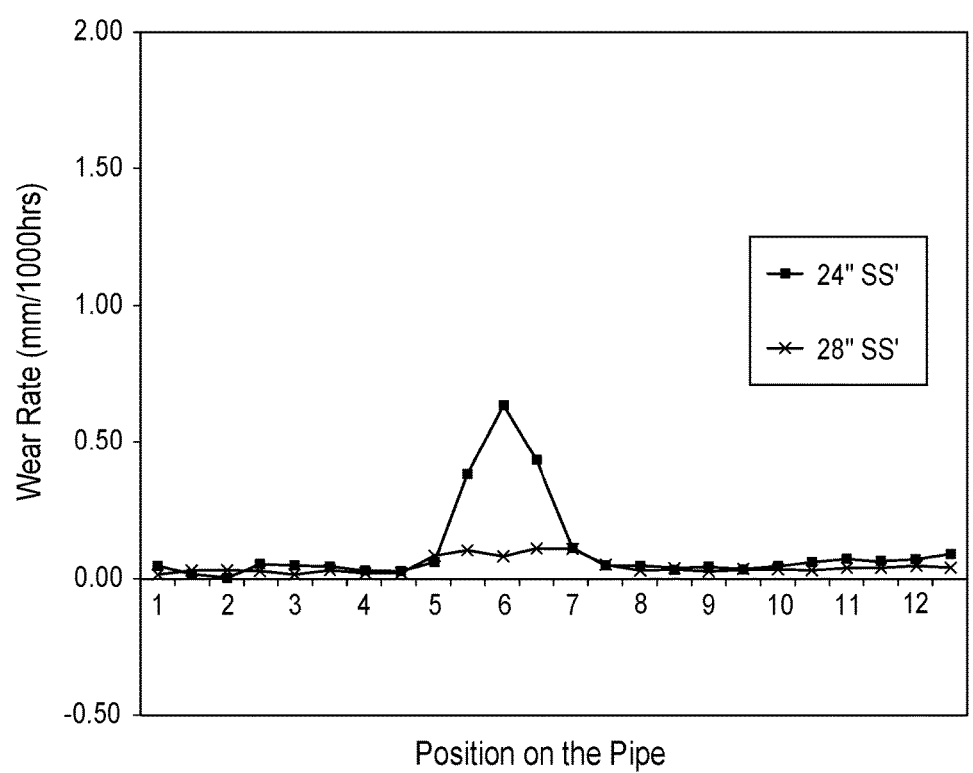
FIG. 7 shows the wear profile of another coarse tailings pipeline comprising both 24" Stainless Steel (SS) pipe and 28" Stainless Steel (SS) pipe, where both pipe diameters are located in the same pipeline.

FIG. 7 shows the wear results of a second coarse tailings pipeline, Coarse Tailings Pipeline 2, which was comprised of both 24" pipe and 28" pipe. It can be seen from FIG. 7 that Coarse Tailings Pipeline 2 also showed reduced wear rate in the 28" SS pipe as compared to the 24" SS pipe.

Figure 8:
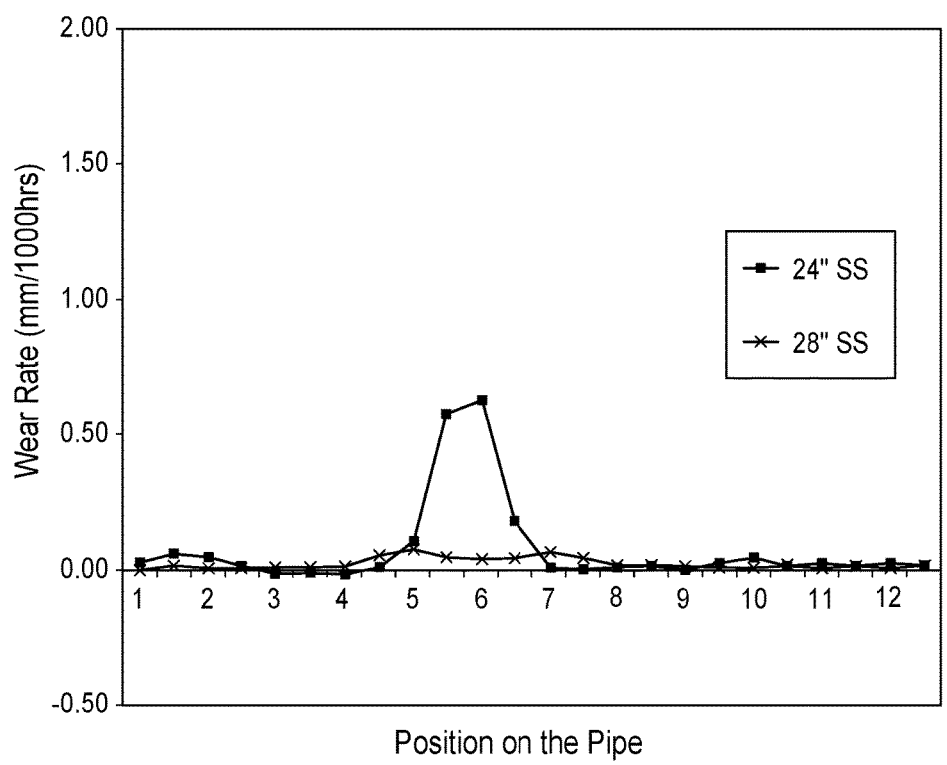
FIG. 8 shows the wear profile of another coarse tailings pipeline comprising both 24" Stainless Steel (SS) pipe and 28" Stainless Steel (SS) pipe, where both pipe diameters are located in the same pipeline.

Finally, FIG. 8 shows the wear results of yet another coarse tailings pipeline, Coarse Tailings Pipeline 3, which was comprised of both 24" pipe and 28" pipe, which also showed reduced wear rate in the 28" SS pipe as compared to the 24" SS pipe.

Thus, the benefit of reducing the pipe velocity to below the deposition velocity could be realized with any slurry pipeline system where wear is observed primarily at the 6 o'clock position, for example, even those comprising non-metallic materials, since these often wear only at the bottom as well.

Example 2

Figure 9:
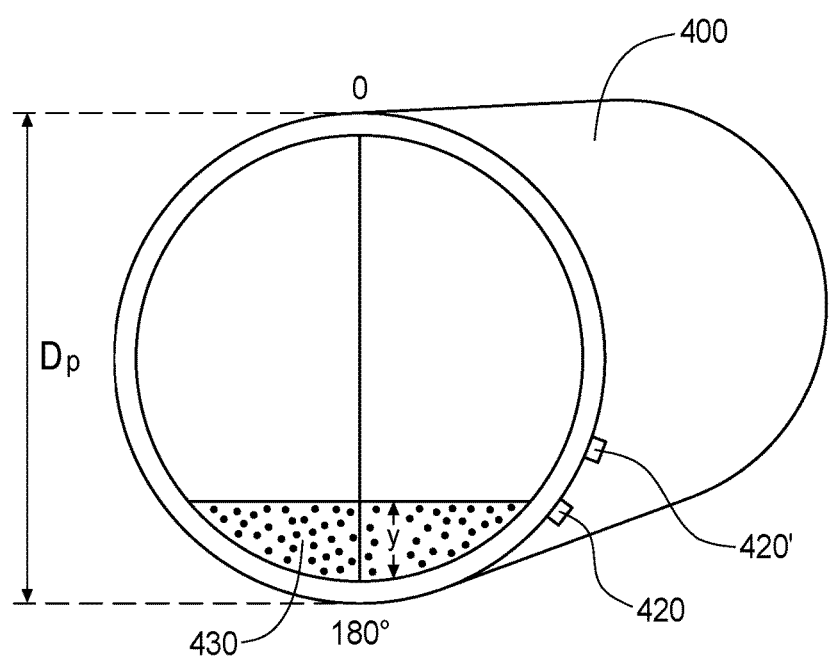
FIG. 9 is an illustration of a pipe and one embodiment for controlling the relative height of the stationary bed of solids.

FIG. 9 is an illustration of a pipe 400 having a pipe diameter (Dp) where two densitometers, 420 and 420', have been placed at about the 155° and 130° position of the pipe 400, respectively. In this example, "y", which is the height of the stationary bed of solids 430, is 5 cm, and Dp is 1 meter. Thus, the relative stationary bed height, y/Dp, is about 0.05, which was found to be around the minimum relative height for the stationary bed for reduced pipe wear at the 6 o'clock position (i.e., 180° position) of the pipe 400. Densitometer 420 is positioned to be able to detect the minimum relative height of 0.05.

Figure 10:
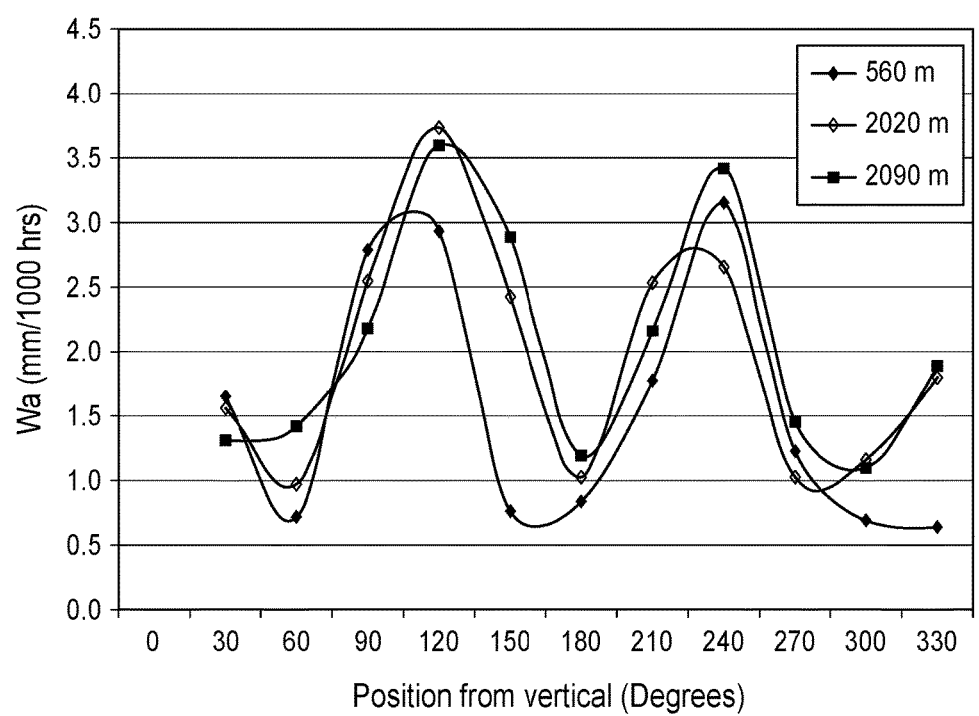
FIG. 10 shows the wear pattern of a coarse tailings pipeline having a stationary bed of solids having a relative height of greater than 0.25.

It was found, however, that if the relative bed height is too high, i.e., approaches 0.25, while the wear at the 6 o'clock position of the pipe is still reduced, wear at the 4 o'clock (i.e., 120° position) and 8 o'clock position (i.e., 240° position of the pipe) begins to increase. This is believed to be due to the disturbance/movement of the surface of the bed at this high relative bed height, which will then cause wear of the pipe. Such wear pattern can be seen in FIG. 10. It can be seen in FIG. 10 that wear at the 180° position is still quite low (about 0.7 to about 1.0 mm/1000 hrs). However, at both the 120° position and the 240° position, wear begins to reach about 3.5 mm/1000 hrs or greater. Thus, the relative bed height cannot be too large, as increased wear will be seen at the bed interface at the 4 o'clock and 8 o'clock position. Hence, densitometer 420' is positioned to be able to detect the maximum relative height of 0.25.

Ideally, the stationary or near stationary bed of solids will have a relative bed height (y/Dp) of about 0.05, i.e., about 5% of the diameter of the pipe, to about 0.1, i.e., about 10% of the diameter of the pipe. Wear is still reduced, even at the 4 o'clock and 8 o'clock positions when the stationary or near stationary relative bed height is between about 0.05 and 0.2. However, generally, the relative bed height must be less than about 0.25.

The densitometers 420 and 420' in FIG. 9 will continuously monitor the height y of the stationary bed of solids 430 and when the relative stationary bed height (y/Dp) approaches about 0.25, the velocity of the slurry must be increased, i.e., the throughput through the pipeline is increased, in order to reduce the height of the stationary or near stationary bed. Similarly, when the relative stationary bed height is below about 0.05, the velocity (throughput) of the slurry is decreased to ensure a stationary or near stationary bed forms.

From the foregoing description, one skilled in the art can easily ascertain the essential characteristics of this invention, and without departing from the spirit and scope thereof, can make various changes and modifications of the invention to adapt it to various usages and conditions. Thus, the present invention is not intended to be limited to the embodiments shown herein, but is to be accorded the full scope consistent with the claims, wherein reference to an element in the singular, such as by use of the article "a" or "an" is not intended to mean "one and only one" unless specifically so stated, but rather "one or more". All structural and functional equivalents to the elements of the various embodiments described throughout the disclosure that are known or later come to be known to those of ordinary skill in the art are intended to be encompassed by the elements of the claims. Moreover, nothing disclosed herein is intended to be dedicated to the public regardless of whether such disclosure is explicitly recited in the claims.

We claim:

1. A process for operating a slurry transportation pipeline designed for transporting a slurry derived from an oil sands extraction process, comprising:

determining the deposition velocity for a particular slurry derived from an oil sands extraction process being transported through the pipeline; and operating the pipeline at an operating velocity below the deposition velocity to form a stationary or near stationary bed of solids at or near the 6 o'clock position of the pipeline that will still allow the slurry to freely flow through the pipeline and not plug the pipeline while reducing the pipeline wear rate.

2. The process as claimed in claim 1, wherein the operating velocity is not more than about 40% below the deposition velocity.

3. The process as claimed in claim 1, wherein the operating velocity is about 5% below the deposition velocity.

4. The process as claimed in claim 1, wherein the operating velocity is at least about 10% below the deposition velocity.

5. The process as claimed in claim 1, wherein the operating velocity is between about 10% to about 40% below the deposition velocity.

6. The process as claimed in claim 1, wherein the slurry is an oil sand slurry comprising mined oil sand and water and the pipeline consists of 24" pipe, whereby operating the pipeline at the operating velocity below the deposition velocity is accomplished by replacing some or all of the 24" pipe of the pipeline with 28" pipe while maintain the original hydraulics and pumping capacity.

7. The process as claimed in claim 1, wherein operating the pipeline at the operating velocity below the deposition velocity is accomplished by installing adequate pump horsepower to lift or move the stationary bed when pipeline pressure gradients are trending upwards at constant flow rate and/or the pipeline capacity is being reduced at a given pump speed.

8. The process as claimed in claim 1, wherein the relative height of the stationary or near stationary bed of solids is between about 0.05 and 0.1.

9. The process as claimed in claim 1, wherein the relative height of the stationary or near stationary bed of solids is between about 0.05 and 0.2.

10. The process as claimed in claim 1, wherein the relative height of the stationary or near stationary bed of solids is less than about 0.25 but greater than about 0.05.

11. The process as claimed in claim 1, wherein the height of the stationary or near stationary bed is controlled by pressure gradient, densitometry, electrical tomography, ultrasonic velocity measurements or other instrumentation to avoid pipeline blockage by the stationary or near stationary bed.

12. The process as claimed in claim 1, whereby the wear on the pipeline is reduced so as to increase the overall pipeline service life.

13. The process as claimed in claim 11, whereby the height of the stationary or near stationary bed is about 5% of the diameter of the pipeline.

14. The process as claimed in claim 11, whereby the height of the stationary or near stationary bed is between about 5% and about 20% of the diameter of the pipeline.

15. The process as claimed in claim 11, whereby the height of the stationary or near stationary bed is less than about 25% of the diameter of the pipeline but greater than about 5% of the diameter of the pipeline.

* * * * *